(12) United States Patent
Boffelli (10) Patent No.: US 10,619,689 B2
(45) Date of Patent: Apr. 14, 2020

(54) VENTILATED BRAKE DISC

(71) Applicant: Westinghouse Air Brake Technologies Corporation, Wilmerding, PA (US)

(72) Inventor: Roberto Boffelli, Camisano (IT)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 360 days.

(21) Appl. No.: 15/375,317

(22) Filed: Dec. 12, 2016

(65) Prior Publication Data

US 2018/0163802 A1    Jun. 14, 2018

(51) Int. Cl.
*F16D 65/12* (2006.01)
*F16D 65/02* (2006.01)

(52) U.S. Cl.
CPC .......... *F16D 65/128* (2013.01); *F16D 65/121* (2013.01); *F16D 65/123* (2013.01); *F16D 2065/1312* (2013.01); *F16D 2065/1316* (2013.01); *F16D 2065/1328* (2013.01); *F16D 2065/1392* (2013.01)

(58) Field of Classification Search
CPC .............................................. F16D 2065/1328
USPC .................................................. 188/218 XL
See application file for complete search history.

(56) References Cited

U.S. PATENT DOCUMENTS

| | | | |
|---|---|---|---|
| 2,765,881 A * | 10/1956 | Pierce | F16D 65/123 188/218 A |
| 3,618,729 A | 11/1971 | Ely | |
| 3,804,213 A | 4/1974 | Lucien et al. | |
| 4,132,294 A | 1/1979 | Poli | |
| 4,199,044 A | 4/1980 | Ivens et al. | |
| 4,469,203 A * | 9/1984 | Herbulot | F16D 65/128 188/218 XL |
| 5,010,985 A | 4/1991 | Russell et al. | |
| 5,101,940 A | 4/1992 | Mungo et al. | |
| 5,150,774 A | 9/1992 | Adamson | |
| 5,158,511 A | 10/1992 | Mungo | |
| 5,379,869 A | 1/1995 | Fox | |
| 5,788,026 A | 8/1998 | Poli | |
| 6,119,820 A * | 9/2000 | Steptoe | F16D 65/128 188/218 XL |

(Continued)

FOREIGN PATENT DOCUMENTS

DE    2315134    10/1974
DE    8816836 U1    9/1990

(Continued)

*Primary Examiner* — Bradley T King (74) *Attorney, Agent, or Firm* — Christopher R. Carroll; The Small Patent Law Group LLC (57) ABSTRACT

A friction ring configured to be fixed to a hub at one or more fixation points is provided. The friction ring includes a ring shaped body; an outer surface configured to be contacted by a brake mechanism; an inner surface configured to contact a portion of a hub or axle to impart a braking force thereto; at least one through-hole for receiving a fastener for fixing the friction ring to the hub or axle; and at least two protrusions extending from the inner surface of the friction ring forming a channel. A cross-sectional area of an inflow portion of the channel is smaller than a cross-sectional area of an outflow portion of the channel. A brake assembly including a hub and the fixation ring is also provided.

25 Claims, 8 Drawing Sheets

(56) References Cited

U.S. PATENT DOCUMENTS

| | | | |
|---|---|---|---|
| 6,216,829 B1 * | 4/2001 | Daudi | F16D 65/12 |
| | | | 188/218 XL |
| 6,808,050 B2 | 10/2004 | Lehmann et al. | |
| 8,770,355 B2 | 7/2014 | Gaspers et al. | |
| 2007/0215418 A1 | 9/2007 | Wirth et al. | |
| 2011/0162926 A1 | 7/2011 | Botsch et al. | |
| 2012/0255821 A1 | 10/2012 | Cavagna et al. | |
| 2014/0374201 A1 | 12/2014 | Wurth et al. | |
| 2015/0354648 A1 | 12/2015 | Noriega Gonzalez et al. | |
| 2016/0076613 A1 | 3/2016 | Boffelli | |
| 2017/0009828 A1 * | 1/2017 | Sabeti | F16D 65/128 |

FOREIGN PATENT DOCUMENTS

| | | |
|---|---|---|
| DE | 69011279 T2 | 11/1994 |
| DE | 10047980 A1 | 4/2002 |
| DE | 202009006067 U1 | 8/2009 |
| DE | 202010001995 U1 | 5/2010 |
| DE | 202009013476 U1 | 3/2011 |
| DE | 202011050872 U1 | 1/2013 |
| EP | 0062774 A1 | 10/1982 |
| EP | 0644349 A1 | 3/1995 |
| EP | 0758059 A1 | 2/1997 |
| EP | 0683331 B1 | 10/1998 |
| FR | 1287967 A | 3/1962 |
| WO | 0196758 A1 | 12/2001 |
| WO | 2005045273 A1 | 5/2005 |
| WO | 2009003659 A3 | 1/2009 |
| WO | 2009043398 A1 | 4/2009 |
| WO | 2009087001 A1 | 7/2009 |
| WO | 2010031582 A1 | 3/2010 |
| WO | 2010108671 A1 | 9/2010 |
| WO | 2010136200 A2 | 12/2010 |
| WO | 2011050933 A1 | 5/2011 |
| WO | 2012059586 A1 | 5/2012 |
| WO | WO-2014169196 A1 * | 10/2014 ........... F16D 65/121 |

* cited by examiner

VENTILATED BRAKE DISC

BACKGROUND OF THE INVENTION

Field of the Invention

The present disclosure relates to a brake disc for a rotating body, such as a wheel, and, more specifically, to an annular brake disc with a ventilating structure for directing airflow across at least a portion of the disc to transfer heat therefrom.

Description of Related Art

Brake discs are affixed to wheels or rotors for the purpose of providing a smooth, hard contact surface that can be contacted by a brake shoe or pad controlled by a brake mechanism, such as a brake jaw. When contact between the disc and shoe or pad is established, friction between the elements is sufficient to slow or stop rotation of the wheel. Disc brakes are commonly used in a variety of applications including, for example, industrial machines, such as cranes and lifts, as well as in conveying installations, such as escalators, elevators, ski-lifts, and the like. Disc brake assemblies are also employed in transport vehicles, such as rail cars, public transportation vehicles, trucks, and automobiles.

It is well known that significant heat is created as a result of the frictional contact between the brake shoe and brake disc. The heat may cause thermal expansion of portions of the brake assembly and may cause the brake assembly to deform or degrade following prolonged use. More particularly, known braking apparatus often do not permit uniform distribution of the generated heat leading to wide temperature gradients across the braking assembly. Such temperature gradients may cause fissures and cracks to form in the brake disc. Additionally, cooling airflow is often neither sufficiently uniform nor adequate to counteract the destructive effects of the heat being generated. Instead, cooling air may actually increase temperature gradients on the brake disc worsening thermal transitional phenomena. Additionally, a considerable amount of the heat created on the contact surface of the brake element is transferred to the shaft on which the brake disc is mounted. This transferred heat may cause oxidation to occur on the shaft and/or wheel making replacing brake elements more difficult. Prolonged heat exposure also alters the centering or calibration of the brake elements and/or drive members further affecting performance of the brake system and wheel.

U.S. Pat. No. 4,132,294 to Poli, entitled "Braking disc with replaceable linings, for brake-discs" ("the '294 patent"), which is incorporated by reference herein, discloses an annular brake disc including radial fins or gills for directing airflow between front and rear brake discs of a brake assembly. The front and rear brake discs include openings on the disc surface located near the central portion of the wheel or wheel hub. Air is drawn into the openings and directed radially outward along the inner surface of the brake discs by the fins or gills. Heat created by the brake disc is transferred to the fins or gills and ventilated by the airflow. In this way, the fins or gills remove heat from the brake disc and wheel to improve performance thereof.

Thermal expansion and degradation of a brake assembly is also addressed by the shape of the disc itself. More specifically, to make the brake linings and/or brake discs more accessible and to simplify maintenance, brake discs have been developed that are formed from two or more interlocking segments or friction rings, which can be individually removed and replaced. For example, the '294 patent discloses a disc brake including two or more linings disposed about a central hub.

Other segmented disc brakes are known in which individual segments are spaced apart by a gap to permit the segments to expand when exposed to heat. For example, U.S. Pat. No. 5,788,026 to Poli, entitled "Brake disc assembly for a rotational body", which is incorporated herein by reference, discloses a disc brake having a number of brake disc segments affixed to a rotating body to form an annular ring. Corresponding segments of the disc brake are attached to one another by fasteners extending through-holes in the segments and rotating body. The segments are also slidably connected to adjacent segments in the annular disc brake by joining elements or pins extending from a socket of a segment to a corresponding socket of the adjacent segment. In this way, the segments may move and expand in response to heat, friction, and pressure caused by contact between the disc brake and brake mechanism.

However, a need exists for a brake disc with improved cooling and ventilating structures. Particularly, airflow volume and speed across the disc should be maximized to increase the cooling effect. Furthermore, the airflow pattern should be improved so that airflow is made available to portions of the disc that are most likely to be exposed to substantial heat. The brake disc disclosed herein is designed for such optimized and improved airflow.

SUMMARY OF THE INVENTION

In view of the foregoing, the brake assembly of the present disclosure provides a friction ring or brake disc that connects to a wheel, rotor, or hub and ventilates heat from the brake disc by directing airflow radially outward along an inner surface of the disc. The structure of the brake disc, including radial protrusions or fins and placement of through-holes and fasteners, is designed to maximize ventilation through the disc. Particularly, the present inventor recognized that through specific placement of the through-hole and fin structures, airflow between the disc and hub is effectively maximized. As a result of such airflow, damage from thermal stress and thermal expansion of the disc is effectively reduced. Accordingly, the brake disc assembly is less susceptible to wear-based damage and operates more quietly than known alternative systems.

Generally, this disclosure is directed to a brake assembly configured to be connected to a hub or axle of a rotating body. Advantageously, the assembly addresses or overcomes some or all of the deficiencies and drawbacks associated with existing braking systems.

According to an aspect of the disclosure, a friction ring includes: a ring shaped body; an outer surface configured to be contacted by a brake mechanism; an inner surface configured to contact a portion of a hub or axle to impart a braking force thereto; at least one through-hole for receiving a fastener for fixing the friction ring to the hub or axle; and at least two protrusions extending from the inner surface of the friction ring forming a channel. A cross-sectional area of an inflow portion of the channel is smaller than a cross-sectional area of an outflow portion of the channel.

According to another aspect of the disclosure, a brake assembly includes a brake disc comprising one or more segments arranged to form a front friction ring and a rear friction ring. The friction rings are configured to contact a braking mechanism. The assembly also includes a hub configured to be connected to an axle, the hub comprising a central rotor and a radially extending flange encircling at least a portion of the central rotor. The assembly also includes a pin fixed to and extending through the flange for fixing the brake disc to the flange. Each segment comprises: a body having an outer surface configured to be contacted by a brake mechanism and an inner surface configured to contact a portion of the hub or the axle to impart a braking force thereto; a through-hole extending through the body for receiving the pin for connecting the segment to the hub or the axle; and at least two protrusions extending from the inner surface forming a channel. A cross-sectional area of an inflow portion of the channel is smaller than a cross-sectional area of an outflow portion of the channel.

According to another aspect of the disclosure, a brake disc configured to be fixed to a hub and/or axle at one or more fixation points includes one or more segments arranged to form a front friction ring and a rear friction ring. Each of the one or more segments comprises: a body having an outer surface configured to be contacted by a brake mechanism and an inner surface configured to contact a portion of the hub or the axle to impart a braking force thereto; a through-hole extending through the body for receiving the pin for connecting the segment to the hub or the axle; and at least two protrusions extending from the inner surface forming a channel. A cross-sectional area of an inflow portion of the channel is smaller than a cross-sectional area of an outflow portion of the channel.

Examples of the present invention will now be described in the following numbered clauses:

Clause 1: A friction ring, comprising: a ring shaped body; an outer surface configured to be contacted by a brake mechanism; an inner surface configured to contact a portion of a hub or axle to impart a braking force thereto; at least one through-hole for receiving a fastener for fixing the friction ring to the hub or axle; and at least two protrusions extending from the inner surface of the friction ring forming a channel, wherein a cross-sectional area of an inflow portion of the channel is smaller than a cross-sectional area of an outflow portion of the channel.

Clause 2: The friction ring of clause 1, wherein the channel extends between a circumferential inner edge and a circumferential outer edge of the friction ring and is positioned to direct airflow across the inner surface thereof.

Clause 3: The friction ring of clause 1 or 2, wherein the inflow portion of the channel is disposed radially inwardly from the outflow portion of the channel, such that the airflow is directed from an inner circumferential edge to an outer circumferential edge of the friction ring.

Clause 4: The friction ring of any of clauses 1 to 3, wherein the at least one through-hole is disposed radially inwardly from a radially inner end of each of the protrusions.

Clause 5: The friction ring of any of clauses 1 to 5, wherein the friction ring is configured to be fixed to the hub or the axle with a number of fixation points in order to maximize an air inlet area thereby maximizing an air flux across the inner surface of the friction ring.

Clause 6: The friction ring of any of clauses 1 to 5, wherein the protrusions comprise radially extending fins.

Clause 7: The friction ring of clause 6, wherein the radially extending fins are tapered in the radial direction, such that a radially inner portion thereof is narrower than a radially outer portion thereof, and in a transverse direction, such that portions of the fins adjacent to the inner surfaces are wider than central portions of the fins.

Clause 8: The friction ring of clause 6 or clause 7, wherein the radially extending fins define a central longitudinal axis, the central longitudinal axis being offset from the radius of the segment by at least 5 degrees.

Clause 9: The friction ring of any of clauses 6-8, further comprising at least one transverse rib extending between adjacent radially extending fins, thereby defining a curving airflow path.

Clause 10: The friction ring of clause 9, wherein the at least one through-hole is positioned radially inwardly from the transverse ribs.

Clause 11: The friction ring of any of clauses 1-10, wherein the at least two protrusions are positioned such that a single radius of the friction ring passes through both of the protrusions.

Clause 12: A brake assembly comprising: a brake disc comprising one or more segments arranged to form a front friction ring and a rear friction ring, the friction rings being configured to contact a braking mechanism; a hub configured to be connected to an axle, the hub comprising a central rotor and a radially extending flange encircling at least a portion of the central rotor; and a pin fixed to and extending through the flange for fixing the brake disc to the flange, wherein each segment comprises: a body having an outer surface configured to be contacted by a brake mechanism and an inner surface configured to contact a portion of the hub or the axle to impart a braking force thereto; a through-hole extending through the body for receiving the pin for connecting the segment to the hub or the axle; and at least two protrusions extending from the inner surface forming a channel, wherein a cross-sectional area of an inflow portion of the channel is smaller than a cross-sectional area of an outflow portion of the channel.

Clause 13: The brake assembly of clause 12, wherein the channel extends between a circumferential inner edge and a circumferential outer edge of the inner surface of the segment body, the channel being positioned to direct airflow across the inner surface of the segment body.

Clause 14: The brake assembly of clause 12 or clause 13, wherein each of the one or more segments comprises a single through-hole, such that each of the one or more segments is fixed to the hub at a single fixation point.

Clause 15: The brake assembly of clause 14, wherein, when fixed to the flange, each segment is rotatable about the single fixation point.

Clause 16: The brake assembly of any of clauses 12 to 15, wherein each of the one or more segments is fixed to the hub with a number of fixation points in order to maximize an air inlet area thereby maximizing an air flux across the inner surface of each segment body.

Clause 17: The brake assembly of any of clauses 12-17, wherein the hub comprises at least one inflow port positioned to direct cooling air to the channel.

Clause 18: The brake assembly of clause 17, wherein the inflow port comprises at least one circumferential slot extending about a portion of the rotor.

Clause 19: The brake assembly of any of clauses 12-18, wherein the protrusions comprise a radially extending fin, and further comprising one or more transverse ribs extending between adjacent radially extending fins, the transverse ribs being positioned to define a curving airflow path.

Clause 20: The brake assembly of any of clauses 12-19, wherein the at least two protrusions are positioned such that a radius of the segment passes through each of the at least two protrusions.

Clause 21: A brake disc configured to be fixed to a hub and/or axle at one or more fixation points, the brake disc comprising one or more segments arranged to form a front friction ring and a rear friction ring, wherein each of the one or more segments comprises: a body having an outer surface configured to be contacted by a brake mechanism and an inner surface configured to contact a portion of the hub or the axle to impart a braking force thereto; a through-hole extending through the body for receiving the pin for connecting the segment to the hub or the axle; and at least two protrusions extending from the inner surface forming a channel, wherein a cross-sectional area of an inflow portion of the channel is smaller than a cross-sectional area of an outflow portion of the channel.

Clause 22: The brake disc of clause 21, wherein the channel extends between a circumferential inner edge and a circumferential outer edge of the friction ring and is positioned to direct airflow across the inner surface thereof.

Clause 23: The brake disc of clause 21 or clause 22, wherein each segment comprises a single through-hole, such that each segment is fixed to the hub and/or axle at a single fixation point.

Clause 24: The brake disc of clause 23 wherein, when fixed to the hub and/or axle, each segment is rotatable about the single fixation point.

Clause 25: The brake disc of any of clauses 21 to 24, wherein each of the one or more segments is fixed to the hub with a minimum number of fixation points to maximize an air inlet area thereby maximizing an air flux across the inner surface of each segment body.

The foregoing and other features and characteristics, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

DESCRIPTION OF THE INVENTION

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting. For the purpose of facilitating understanding of the invention, the accompanying drawings and description illustrate preferred embodiments thereof, from which the invention, various embodiments of its structures, construction and method of operation, and many advantages may be understood and appreciated.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures.

The present disclosure is directed to a friction ring or brake disc for a rotating body or wheel structure, such as a railway vehicle wheel. The friction ring or brake disc may be a unitary structure (e.g., a monobloc disc) or segmented, as illustrated in the accompanying figures. The brake disc may be used to restrict rotation of railway vehicle wheels and, specifically, for low speed rail vehicles having a speed of less than 200 km/hr. A brake disc refers to a structure adapted to connect to a rotating body and configured to be contacted by a braking mechanism, such as a brake jaw, brake pad, or brake shoe. Friction between the brake disc and shoe slows or stops rotation of the rotating body. Brake discs are generally either hub mounted or wheel mounted. Hub mounted brake discs (also referred to as an axle mounted disc) are connected to the hub or axle of the rotating body. In contrast, wheel mounted brake discs are connected directly to a surface of the wheel itself rather than to the hub or axle.

In some examples, the brake disc is configured to be fixed to the hub with the minimum number of fixation points allowed by safety calculations. Safety calculations can include computer modeling techniques for modeling forces exerted on the disc during use. Determining the minimum number of fixation points can consider, for example, the number of fixation points needed to form a stable and sufficiently strong connection between the brake disc and hub to ensure sufficient stopping power during use. In the case of a segmented brake disc, each segment may be mounted to the hub at a single fixation point. The segment may be permitted to rotate about the single fixation point. Mounting the segment and/or disc to the hub at a minimum number of fixation points allows for creation of a disc with a maximized air inlet area, thereby providing maximum air flux across an inner surface of the brake disc and a highest possible ventilation.

Figure 1:
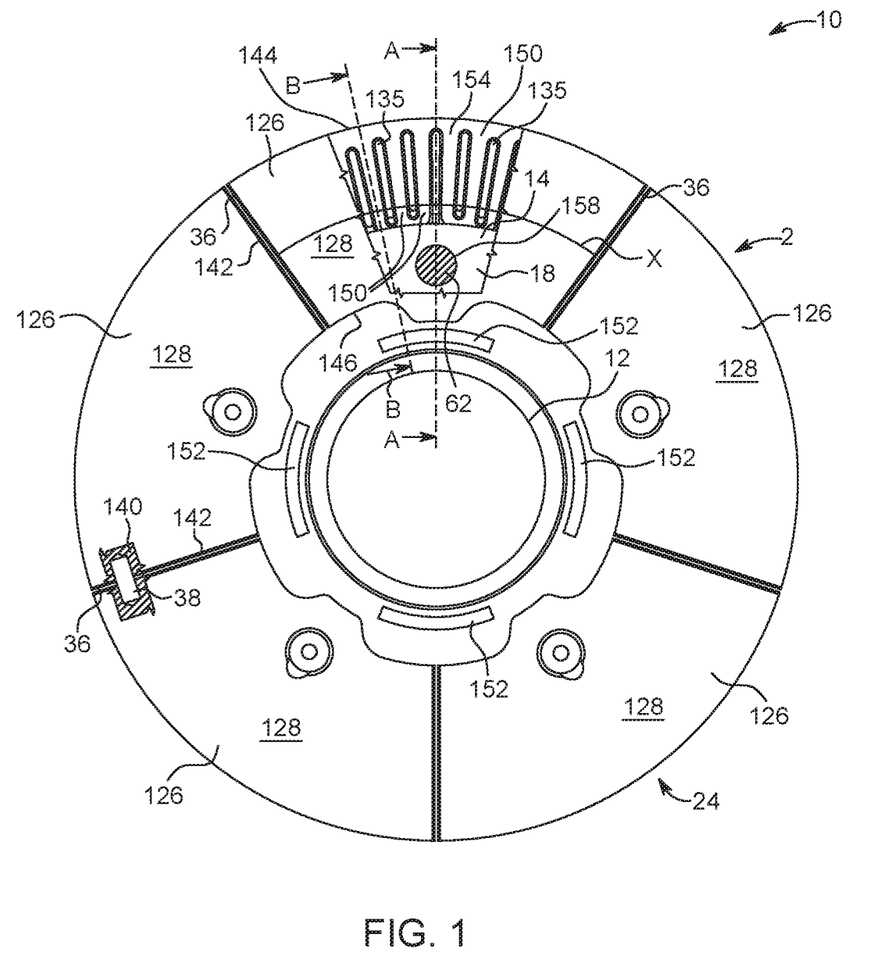
FIG. 1 is a front view of a brake disc assembly according to an embodiment of the invention.
Figure 2:
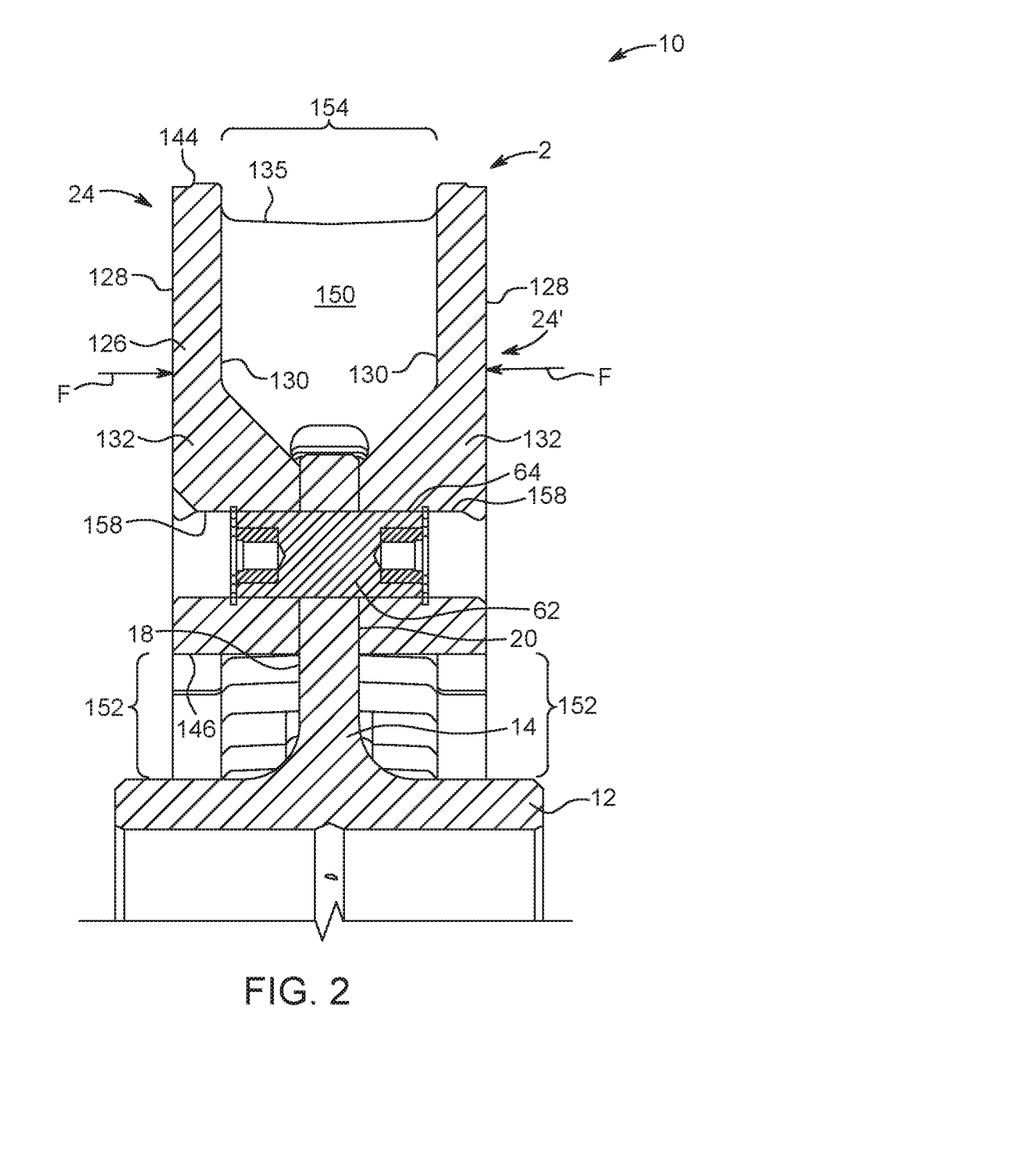
FIG. 2 is a cross-sectional view of a portion of the assembly of FIG. 1 along line A-A in FIG. 1.
Figure 3:
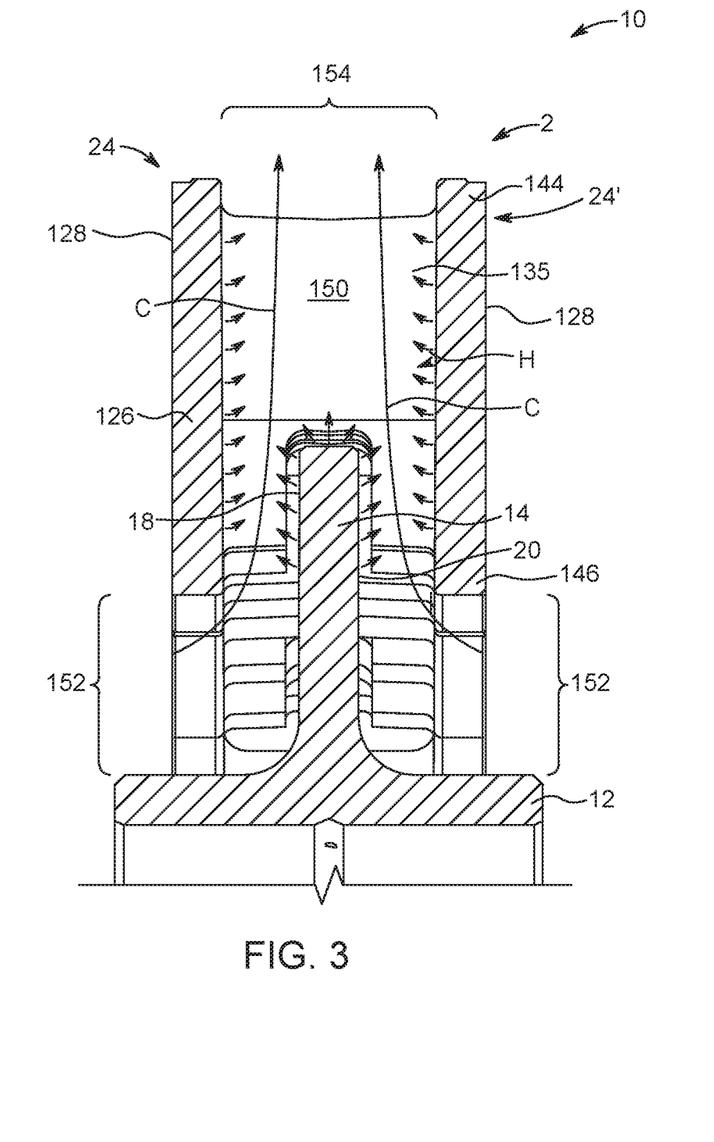
FIG. 3 is a cross-sectional view of a portion of the assembly of FIG. 1 along line B-B in FIG. 1.

With reference to FIGS. 1 to 3, a hub mounted brake disc assembly 10 is illustrated; however, it is understood that the assembly 10 could also be adapted to mount directly to a wheel body within the scope of the present disclosure. The assembly 10 includes a hub 12 with a radial flange 14 extending therefrom. The hub 12 may be configured to receive a rotating body, such as an axle of a railway vehicle or similar rotating structure. The flange 14 includes a front side surface 18 and a rear side surface 20 (shown in FIGS. 2 and 3). The flange 14 may be the same thickness throughout or may include regions having a different thicknesses or rigidity. For example, the flange 14 may include alternating concentric bands (not shown) having high and low rigidity. The rigidity of the various regions may result from varying either the thickness or material composition of the flange 14.

The assembly 10 further comprises a friction ring or brake disc 2 having a front side 24 connected to the front side surface 18 of the flange 14 and a rear side 24' (shown in FIGS. 2 and 3) connected to the rear side surface 20. Generally, it is preferable to affix the sides 24, 24' of the brake disc 2 to a more rigid region of the flange 14 to improve braking performance. In the following discussion, the structure of the front side 24 is described. The rear side 24' has a similar or identical structure as the front side 24 and, therefore, includes the features described hereinafter.

With specific reference to FIG. 1, the brake disc 2 is a segmented disc formed from a plurality of segments 126. For example, the disc 2 can be formed from five substantially identically shaped segments. While a segmented brake disc 2 is described and illustrated herein, it is understood that the brake disc may also be a ring-shaped monobloc structure within the scope of the present disclosure. As shown in FIG. 1, the segments 126 may be connected around the hub 12 to form a closed annular ring. The closed ring may be referred to as a friction ring. While the segments 126 illustrated in FIG. 1 are the same size and shape, it is understood that the brake disc 2 may include segments having different shapes and sizes. The total number of segments may be even or odd.

The segments 126 may be separated from one another by a radial gap 36 between the radial ends 142 of adjacent segments 126 so that the segments 126 can freely expand or contract depending on the temperature and force applied by the brake shoe or pad. The segments 126 are connected together by joining elements 38 extending across the gap 36. In the embodiment of the disc assembly 10 shown in FIG. 1, each segment 126 is connected to the adjacent segment 126 by one joining element 38 located near the outer circumferential side 144 of the segment 126. In certain embodiments, the brake disc 24 may include multiple joining elements 38 between each segment 126. For example, the assembly 10 could include two joining elements 38 between each segment 126. The joining elements 38 may be positioned at equidistant positions from the central axis X of the segment 126. The joining element 38 may be a pin, fastener, or slider as is known in the art. The joining elements 38 are configured to be inserted in a socket 140 extending inward from the radial end 142 of each segment 126, such that each joining element 38 extends between corresponding sockets 140 of adjacent segments 126. In one embodiment, the depth of each socket 140 is greater than the length of the associated joining element 38. Accordingly, the segments 126 are free to move, relative to the joining elements 38, causing the joining element 38 to insert farther into one segment 126 and to pull away from the adjacent segment 126.

With specific reference to FIGS. 2 and 3, each side 24, 24' of each segment 126 comprises an outer surface 128, which functions as a standard braking surface. The outer surface 128 provides a substantially flat surface or face that is configured to be contacted by a brake surface, such as a brake shoe or pad controlled by a braking mechanism. Optionally, the surface 128 may include regions that have been treated or machined to increase texture, hardness, or durability thereof to improve contact and, if necessary, to increase friction between the outer surface 128 and braking mechanism. Each side 24, 24' of each segment 126 also includes an inner surface 130 opposite the outer surface 128. A portion of the inner surface 130 is configured to contact the front side surface 18 and flange 14 to provide a stopping force F thereto when the brake assembly 10 is in use. As shown in FIG. 2, to facilitate contact between the segment 126 and flange 14, the inner surface 130 of the segment 126 may include a thicker or wider portion 132 that physically contacts the front side surface 18 of the flange 14. In that case, the segment has a generally tapered appearance that is thicker adjacent to the hub 12 and thinner near the outer circumferential side 144 of the segment 126.

With continued reference to FIGS. 2 and 3, the segments 126 may further comprise protrusions extending between the inner surfaces 130 of the front side 24 and the rear side 24' each segment 126. In some embodiments, as shown in FIGS. 1 to 4, the protrusions comprise radially extending fins. In other embodiments, the protrusions may comprise ribs, baffles, columns, walls, or any combination thereof. The protrusions may be integrally formed with the inner surface 130 of the segment 126 or attached thereto using a known adhesive or fastener. The protrusions are arranged to direct a cooling airflow C (shown in FIG. 3) or air flux across the surface of the flange 14 and inner surface 130 of the segment 126 for ventilating and cooling the flange 14 and segment 126. Providing a continual supply of cool air when the disc assembly 10 is in use counteracts the effect of heat created from the contact between the segment 126 and braking mechanism. Cooling and ventilating the segment 126 provides a more even temperature gradient across the segment 126 that prevents degradation of the segment 126 as a result of thermal stresses and thermal expansion.

It is noted that for a wheel mounted brake disc, the front side 24 and the rear side 24' of the segments 126 are separated. In that case, the protrusions include contact surfaces that contact the surface of the wheel or rotating body. Advantageously, when the sides 24, 24' are separated or divided in this manner, they are free to slide or move relative to one another. As a result, thermal expansion of the segments 126 is not restricted. Similarly, thermal stresses caused by expansion are not translated between opposing segments 126, reducing the possibility that the protrusions will be damaged during use.

Figure 4:
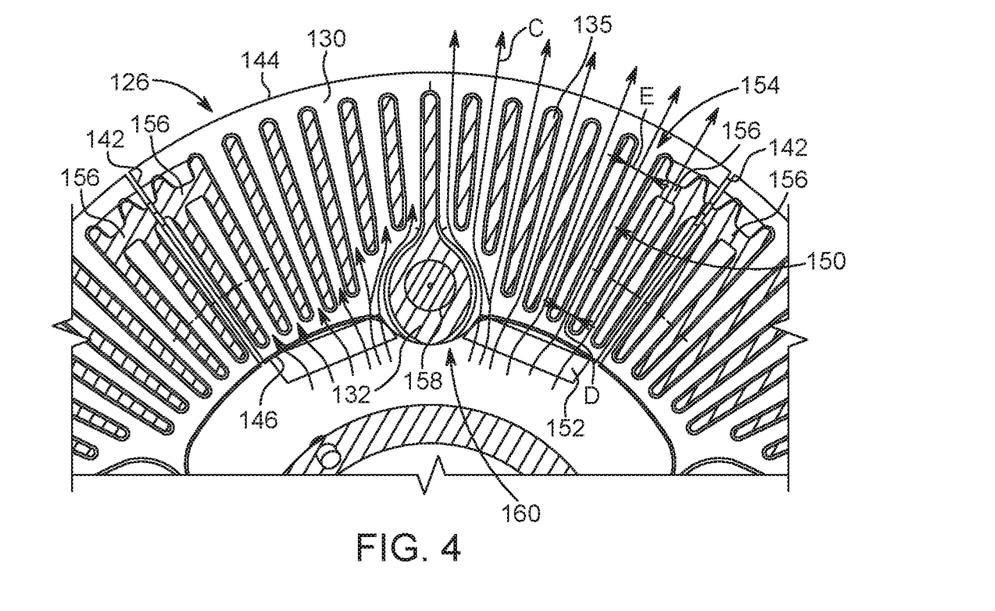
FIG. 4 is a cross-sectional view of a portion of the assembly of FIG. 1 taken along a plane parallel to the face of the brake disc segment.
Figure 5:
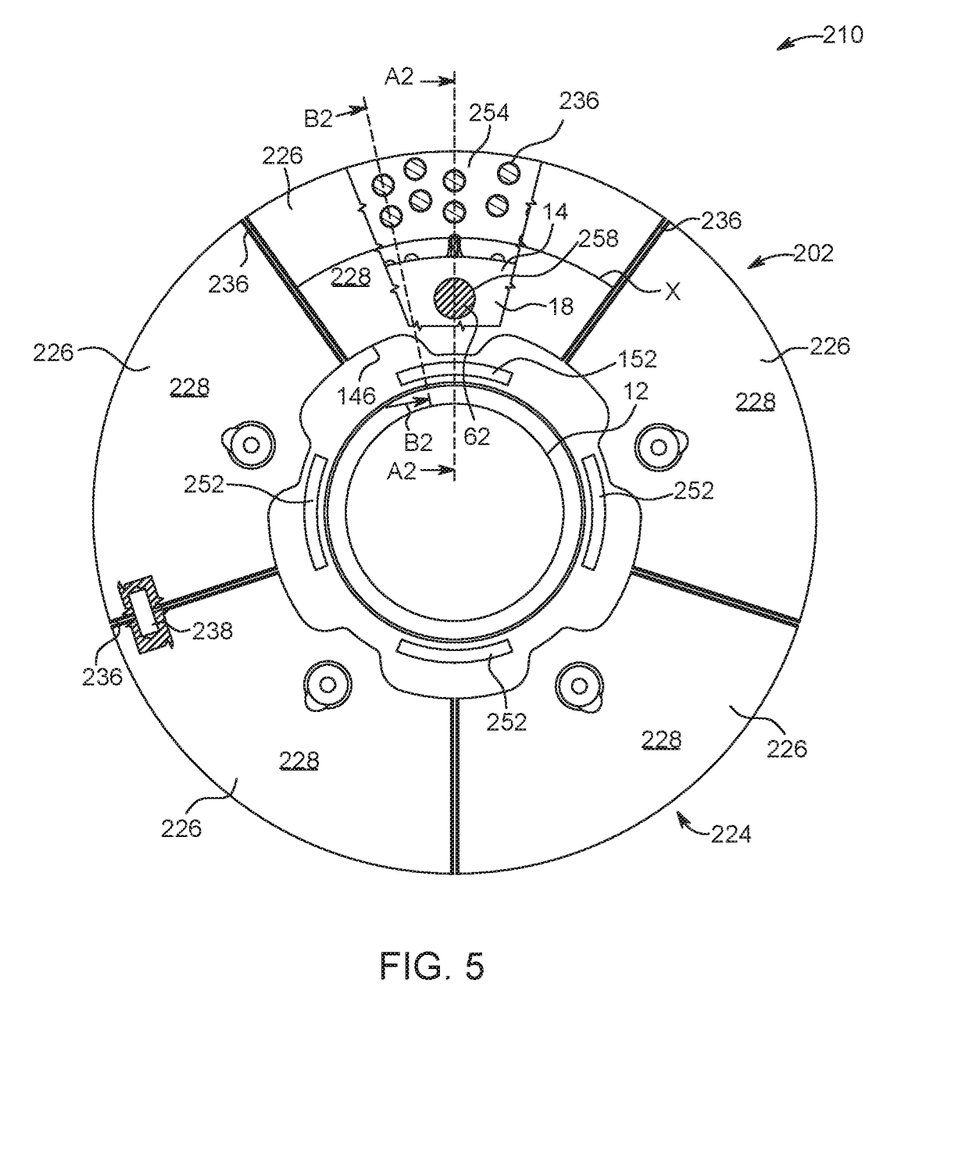
FIG. 5 is a front view of another exemplary brake disc assembly according to an embodiment of the invention.

With continued reference to FIGS. 2 and 3, as well as FIG. 4, the protrusions may be radial fins 135 having a long, thin structure with substantially flat opposing faces. The fins 135 are positioned to maximize ventilation through the brake disc assembly 10. Maximizing ventilation enhances cooling of the brake disc segments 126. As shown in FIG. 4, the fins 135 may have a substantially rectangular or elliptical base area that contacts the inner surface 130 of the segment 126. The fins 135 may extend radially outwardly along the inner surface 130 of the segment 126 from the inner circumferential edge 146 thereof to the outer circumferential edge 144. The fins 135 may be tapered, becoming narrower as the distance from the inner surface(s) 130 increases. The fins 135 may also be wider near the inner circumferential side 146 of the segment 126 and narrower near the outer circumferential side 144, such that the distance between adjacent fins 135 increases farther away from the hub 12.

In certain embodiments, the fins 135 may extend radially outward from the inner circumferential side 146 directly along a radius of the segment 126. Alternatively, the fins 135 may be positioned elsewhere on the inner surface 130 of the segment 126 to obtain various airflow patterns. For example, in certain embodiments, some of the fins 135 may be positioned such that a central axis of the fin 135 is angled (for example by at least 5 degrees) relative to the radius of the segment 126. In this orientation, distances between adjacent fins 135 increases substantially radially outward from the hub 12. In certain other embodiments, a central axis of each fin 135 may be parallel to a central axis of adjacent fins. The fins 135 may also be different lengths, such that fins 135 located near the radial ends 142 of the segment 126 are longer than fins 135 near the center of the segment 126. As will be described hereinafter, having fins 135 with different lengths allows for various connection structures to be included on the inner surface 130 of the segment 126 for connecting the segment 126 to other segments 126 and/or to the hub 12 (shown in FIGS. 2 and 3).

In certain embodiments, the fins 135 may be positioned to define channels 150 between adjacent fins 135. For example, the channels 150 can be radially extending channels 150 as shown in FIGS. 1-4. The channels 150 are enclosed by the radially extending sides of the fins 135, the inner surfaces 130 of the opposing sides 24, 24' of the segments 126, and the front and rear sides 18, 20 of the flange 14. External cool air enters the channels 150 through an inlet portion 152, located between the inner circumferential side 146 of the segment 126 and the hub 12, and passes through the channels 150 along cooling airflow C (shown in FIGS. 3 and 4). The air is expelled from the channels 150 through outlet portions 154 located near the outer circumferential side 144 of the segments 126. The inlet portion 152 may be an annular opening extending around the hub 12. Alternatively, in certain embodiments, the inlet portion(s) 152 may be a number of distinct holes, slots, or openings located around the hub 12. The outlet portion 154 may also be an annular opening, a partially annular opening, a slot, or a number of holes arranged around the outer circumferential side 144 of the segments 126. In each case, however, the cross-sectional area of the inlet portion 152, even if maximized, is less than the cross-sectional area of the outlet portion 154. Thus, the cross section area of the channels 150 increases farther away from the center of the disc 24.

With specific reference to FIG. 4, the increase in cross-sectional area between the inlet portion 152 and the outlet portion 154 causes the airflow rate or air speed to increase along the length of the channel 150. The increased air speed improves ventilation and cooling of the segment 126. To achieve the change in cross-sectional area, in certain embodiments, the width of the channels 150 increases along its length, such that the width D of the channel 150 near the inlet portion 152 is less than the width E of the channel 150 at the outlet portion 154 (shown in FIG. 3).

The fins 135 may be arranged in various patterns to increase airflow through the channels 150. For example, as described above, the length of the fins 135 may vary, such that fins 135 located near the radial ends 142 of the segment 126 are longer than fins 135 in a central portion of each segment 126. In addition, fins 135 located near the radial ends 142 of the segment 126 may be contacted by a lateral member 156. The lateral member 156 may house the socket 140 and joining element 38 illustrated in FIG. 1. The lateral member 156 may block or restrict airflow through the channels 150 located adjacent to the member 156, thereby forcing air through other channels 150.

With reference again to FIGS. 2 to 4, each segment 126 further includes at least one fixation point for connecting the segment 126 to the hub 12. Desirably, the number of fixation points on each segment 126 is minimized to reduce the number of airflow restricting structures or protrusions extending from the inner surface 130 of the segment 126. Minimizing the number of airflow restricting structures maximizes the air flux between the segment 126 and wheel hub 12 leading to an improved ventilation effect. Preferably, the segment 126 includes only a single fixation point, generally positioned near the inner circumferential side 146 of the segment 126.

For example, the fixation point may be a transverse through-hole 158 (not shown in FIG. 3) extending between the outer surface 128 (not shown in FIG. 4) and the inner surface 130 of the segment 126. Preferably, each segment 126 includes only one transverse through-hole 158. In certain embodiments, the segment 126 may also include an extended portion 160 (shown in FIG. 4) or bracket to accommodate the through-hole 158. The through-hole 158 may be surrounded by the wider portion 132 of the inner surface 130. As shown in FIG. 4, the wider portion 132 may be integrally formed with one of the fins 135. The wider portion 132 of the fins 135 restricts or limits airflow through the brake disc 24, reducing the effectiveness of the ventilation. Therefore, reducing the number of through-holes 158 increases the efficiency of ventilating the brake disc. The wider portion 132 may have a channel 150 on either side thereof. The arrangement and shape of the wider portion 132 of the inner surface 130 allows for good airflow to ventilate heat away from the wider portion 132 of the inner surface 130 and through-hole 158.

Through-holes 158 are configured to receive a fastener 62, such as a pin, screw, or bolt, for connecting the brake disc 2 to the flange 14 of the hub 12. The flange 14 includes a bore 64 aligned with each through-hole 158 and configured to receive the fastener 62. The fastener 62 should be sufficiently strong to support loads generated by contact between the brake disc segments 126 and the brake surface. As described above, the present inventor recognized that the number of through-holes 158 should be minimized to increase airflow through the brake disc 24. Accordingly, the fastener 62 may have enhanced strength and resistance to deformation to absorb greater rotational forces created since the segment 126 is only connected to the hub 12 at a single fixed point. The fastener 62 may be inserted through the through-hole 158 and bore 64 of the flange 14 to rigidly and fixedly connect the segments 126 to the flange 14 and hub 12.

In certain embodiments, the through-holes 158 may be deep enough so that a top portion of the fastener 62 is recessed within the through-hole 158 so that it does not extend above the through-hole 158 opening. Recessing the fastener 62 ensures that it does not contact or obstruct the brake surface, such as the brake shoe or brake pad.

In use, the brake disc assembly 10 is rotated by rotation of an axle connected to the hub 12, causing the brake disc 2 attached thereto to rotate as well. The rotation produces a centrifugal effect in which air is forced radially outward from the assembly 10 through outlet portions 154 defining by the segments 126. More specifically, in some examples, the radial fins 135 are arranged to produce a centrifugal pumping effect in which air is drawn into the channels 150 through the inlet portion 152 and expelled through the outlet portion 154 along cooling airflow path C shown in FIG. 3.

To stop or slow rotation of the axle, the braking force F is applied to the outer surface(s) 128 of the segments 126. The braking force F is transmitted to the flange 14 and hub 12 by the protrusions of the segments 126 and the fastener 62 extending through the flange 14. More particularly, the force F is applied in the circumferential direction causing the segments 126 contacted by the brake surface (e.g., the brake shoe or pads) to pivot about a fixation point defined by the through-hole 158, thereby transmitting force to adjacent segments 126 as well. Since the segments 126 are slidably connected by the joining elements 38, the segments 126 are permitted to pivot or rotate in response to the applied force. However, since forces applied to adjacent segments 126 on opposite sides of the contacted segment 126 are equal in force, but opposite in direction, rotation of the segments 126 is restricted. Therefore, the segments 126 are effectively locked together, meaning that the brake disc 10 functions as a continuous or unitary structure, even though the segments 126 are separated by the radial gap 36, and otherwise would be capable of rotation about the fixation point.

When the brake assembly 10 is in use, heat H (shown in FIG. 3) is created causing the contacted segments 126 to expand. The heat H is translated from the segments 126 through the protrusions, such as the fins 135, to the flange 14 and hub 12. The segments 126 are also exposed to centripetal forces that tend to push the segments 126 radially outward away from the hub 12. The fastener 62 must be mechanically strong enough to counteract such centripetal force to prevent the segments 126 from sliding outward away from the hub 12. The rotational or centripetal force caused by rotation of the brake disc assembly 10 also draws cooling air into the brake disc 24 through the inlet portion 152. The airflow C is directed through the channels 150 and flows past the fins 135, flange 14, and inner surface 130 of the segment 126. The cooling airflow C also flows around the wider portion 132 of the inner surface 130 surrounding the through-hole 158. The heat H is transferred from the surfaces of the flange 14 and segments 126 to the airflow C and driven away from the brake disc assembly 10 through the outlet portion 154 as a result of the centrifugal pumping motion described above. In this way, heat H is ventilated away from the segment 126 and brake disc assembly 10 to improve braking performance and to prevent the segment 126, flange 14, and hub 12 from structurally degrading from prolonged use.

With reference to FIGS. 5 to 8, another exemplary brake disc assembly 210 comprising a friction ring or brake disc 202 connected to a hub 12 is illustrated. The brake disc 202 is arranged to direct airflow through the brake disc 202 in the inverse direction from the airflow in the brake discs 2 described in connection with FIGS. 1 to 4. For example, as described herein, by removing or reducing the number and density of radial fins 135, the pumping effect described in connection with FIGS. 1 to 4 can be reduced or eliminated. Instead, in the brake disc 202, cooling air may be drawn into the disc 202 through openings at the outer circumferential edge thereof and directed through the brake disc 202 towards outflow elements located adjacent to the hub 12 or axle of the brake assembly 210.

In some examples, the brake disc 202 comprises a plurality of segments 226 connected together to form a ring. The disc 202 can comprise about five segments, substantially identical in size and shape. The segments 226 can be connected together in a circumferential direction by pins or joining elements 238, extending between adjacent segments 226. The joining elements 238 can create gaps 236 between adjacent segments 226. The gap 236 permits expansion and contraction of the segments 226 during use.

Figure 6:
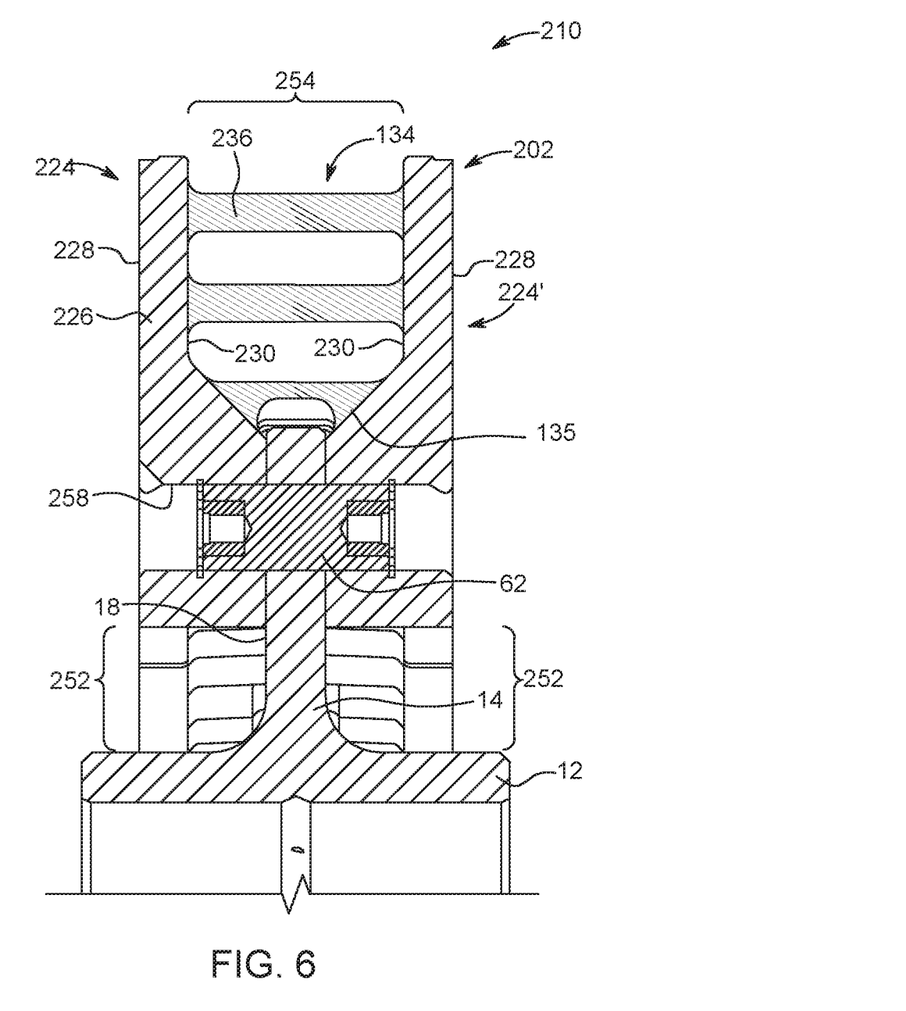
FIG. 6 is a cross-sectional view of a portion of the assembly of FIG. 5 along line A2-A2 in FIG. 5.
Figure 7:
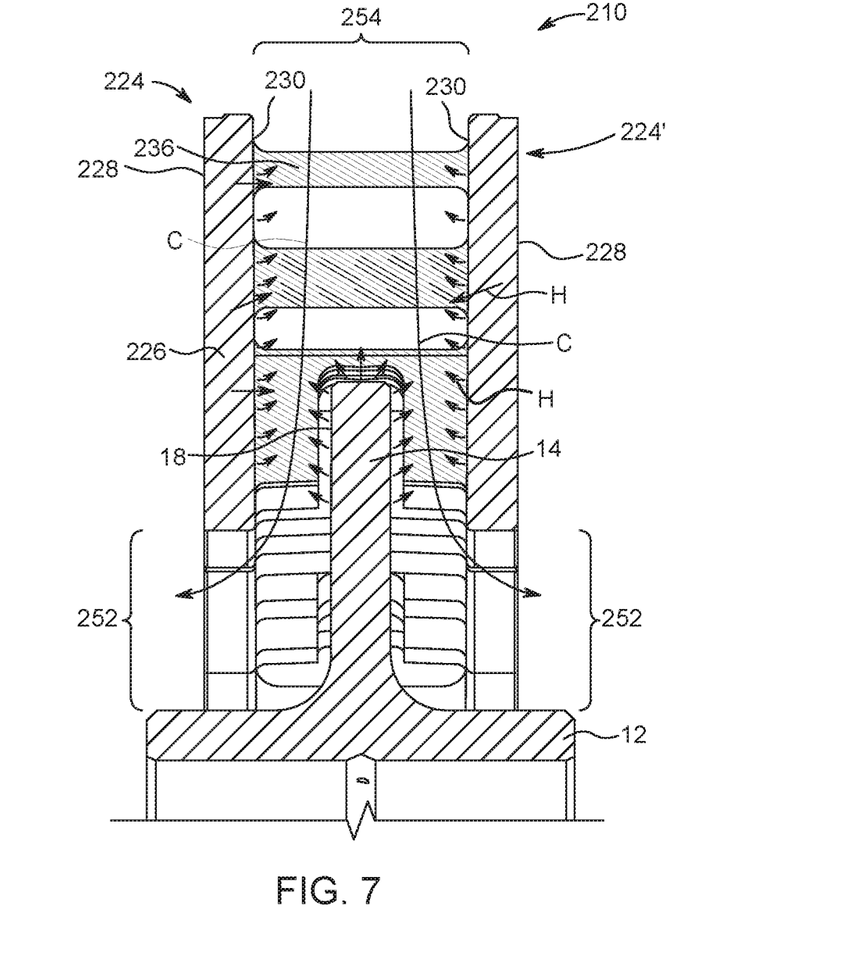
FIG. 7 is a cross-sectional view of a portion of the assembly of FIG. 5 along line B2-B2 in FIG. 5.

The segments 226 can comprise a front side 224 and a rear side 224', each having an outer surface 228, configured to be contacted by a brake surface to impart a braking force thereto, and an opposing inner surface 230. As shown in FIGS. 6 and 7, the front side 224 can be connected to and/or integrally formed with the rear side 224' to form a unitary structure. As in previously described examples, the segments 226 are fixed to the hub 12 at fixation points, such as through-holes 258 positioned at radially inward portions of the segments 226 and sized to receive pins 62. In some examples, each segment 226 is fixed to the hub 12 at only one fixation point, such as a fixation point defined by a single through-hole 258. In this configuration, when connected to the hub 12, the segment 226 is capable of rotating about the single fixation point.

The segments further comprise a plurality of protrusions extending between inner surfaces 230 of the sides 224, 224' of the segments 226. As shown in FIGS. 5-8, some of the protrusions can be transversely extending elements, such as ribs 236. As used herein, a transversely extending element or structure refers to a structure having a transverse cross-sectional area that is greater than its radial cross-sectional area. The ribs 236 can be integrally formed with the segments 226 or fixedly connected thereto. In some examples, the ribs 236 may have a circular or elliptical radial cross section positioned to direct airflow passing through the segments 226 in a curved or curving airflow path. The airflow path is shown by arrow C in FIGS. 7 and 8.

Figure 8:
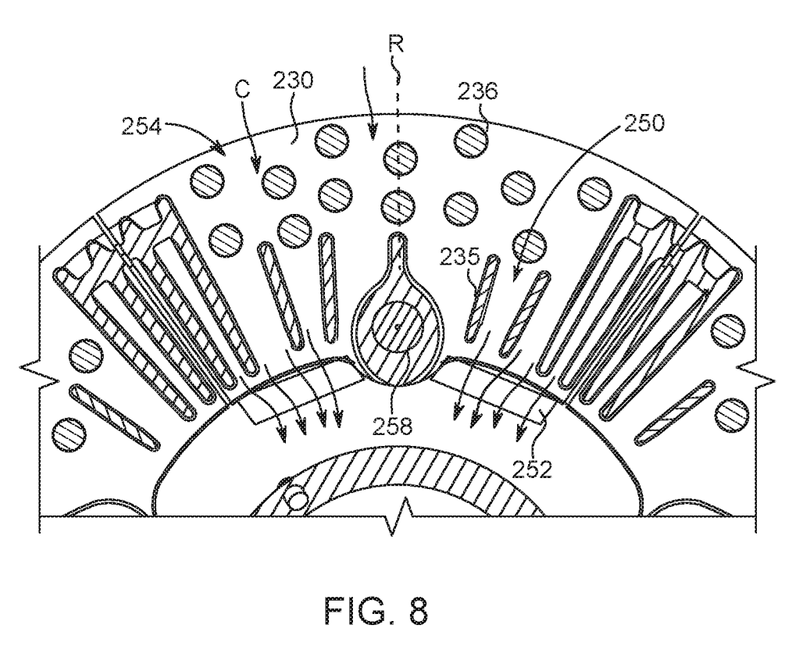
FIG. 8 is a cross-sectional view of a portion of the assembly of FIG. 1 taken along a plane parallel to the face of the brake disc segment.

The ribs 236 can be positioned on the radially outer half or outer third of the segment 226, and arranged such that at least one radius R (shown in FIG. 8) of the segment 226 passes through at least two ribs 236. In some examples, the through-hole 258 is positioned radially inwardly from the ribs 236. As shown in FIG. 8, the segment 226 may further comprise a number of protrusions in the form of radially extending fins 235, similar in shape to fins 135 described in connection with FIGS. 1 to 4. The fins 235 define channels 250 for directing airflow across the inner surface(s) of the segment 226. In some examples, as shown in FIG. 8, fins 235 extend from an inner circumferential surface of the middle portion of the segment 226.

In use, the brake disc assembly 210 is rotated by rotation of an axle connected to the hub 12, causing the brake disc 202 attached thereto to rotate as well. The rotation produces a centripetal effect in which air is drawn radially inwardly through each segment 226. For example, as show in FIGS. 7 and 8, an airflow path of cooling air C is drawn into the brake disc 202 at inflow portions 254 located adjacent to an outer circumferential edge of each segment 226.

Advantageously, the ribs 236 only cover or block a small portion of the inflow portion 254 of each segment 226 meaning that a substantial volume of cooling air can be drawn into the segment 226 in this manner. For example, the circumferentially outermost portions of each segment 226 may have only about three (3) to six (6), and preferably about four (4) ribs 236. In comparison, the circumferentially outermost portions of the segment 126 shown in FIG. 4 includes about ten (10) to fifteen (15) fins 135, which cover or block about 40 to 60 percent of the airflow through the segment 126.

To stop or slow rotation of the axle, a braking force is applied to the outer surface(s) 228 of the segments 226. The braking force is transmitted to the flange 14 and hub 12 by the protrusions (e.g., the fins 235 and ribs 236) of the segments 226 and the fastener 62 extending through the flange 14. The braking force can also cause the segments 226 to pivot about a fixation point defined by the through-hole 258, thereby transmitting force to adjacent segments 226.

When the braking force is applied to the segment(s) 226, heat H (shown in FIG. 7) is created causing the contacted segments 226 to expand. The heat H is translated from the segments 226 through the protrusions (e.g., the fins 235 and ribs 236) to the flange 14 and hub 12. The heat H is counteracted by the cooling airflow C. Specifically, the airflow C passes around the ribs 236 and through the channels 250 defined by the fins 235. The heat H is transferred from the surfaces of the flange 14 and segments 226 to the cooling airflow C and is driven away from the brake disc assembly 210 through the outlet portions 252. In this way, heat H is ventilated away from the segment 226 and brake disc assembly 210 to improve braking performance and to prevent the segment 226, flange 14, and hub 12 from structurally degrading from prolonged use.

While specific embodiments of the brake disc and rotating body have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. Further, although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A friction ring, comprising:
    a plurality of segments configured to be affixed to a hub or an axle and arranged about the hub or axle to form a ring shaped body, wherein each segment comprises:
        a front side and a rear side, each side comprising an outer surface configured to be contacted by a brake mechanism and an inner surface connected to a portion of the hub to impart a braking force thereto;
        a single through-hole extending between the outer surface of the front side and the outer surface of the rear side of the segment for receiving a fastener for fixing the segment to the hub or axle; and
        at least two protrusions extending from the inner surface of the front side to the inner surface of the rear side of the segment, the at least two protrusions forming a radially open channel therebetween,
    wherein a cross-sectional area of an inflow portion of the channel between the at least two protrusions is smaller than a cross-sectional area of an outflow portion of the channel between the at least two protrusions.

2. The friction ring of claim 1, wherein the channel extends between a circumferential inner edge and a circumferential outer edge of the segment and is positioned to direct airflow across the inner surface of the front side or the inner surface of the rear side of the segment.

3. The friction ring of claim 1, wherein the inflow portion of the channel is disposed radially inwardly from the outflow portion of the channel, such that airflow is directed from an inner circumferential edge to an outer circumferential edge of the segment.

4. The friction ring of claim 1, wherein the single through-hole of each segment fixes the segment to the hub or the axle at a single fixation point in order to maximize an air inlet area thereby maximizing an air flux across the inner surface of the friction ring.

5. The friction ring of claim 1, wherein the protrusions comprise radially extending fins.

6. The friction ring of claim 5, wherein the radially extending fins are tapered in the radial direction, such that a radially inner portion thereof is narrower than a radially outer portion thereof, and in a transverse direction, such that portions of the fins adjacent to the inner surfaces are wider than central portions of the fins.

7. The friction ring of claim 5, wherein each of the radially extending fins defines a linear longitudinal axis extending from a radially inner portion of the fin to a radially outer portion of the fin, and wherein the linear longitudinal axis of each fin is offset from a radius of the friction ring by at least 5 degrees.

8. The friction ring of claim 5, further comprising at least one transverse rib extending between adjacent radially extending fins, thereby defining a curving airflow path.

9. The friction ring of claim 8, wherein the at least one through-hole is positioned radially inwardly from the transverse ribs.

10. The friction ring of claim 1, wherein the at least two protrusions are positioned such that a single radius of the friction ring passes through both of the protrusions.

11. The friction ring of claim 1, wherein the single through-hole is positioned radially inward from a central circumferential axis of each segment.

12. The friction ring of claim 1, wherein the protrusions of each segment comprise a plurality of radially extending fins defining a plurality of radially open channels between adjacent fins of the plurality of fins, and wherein the single through-hole of each segment is positioned such that a cross-sectional area of each of the plurality of open channels remains constant or increases along an entire length of the channel, from the inflow portion to the outflow portion of the channel.

13. The friction ring of claim 1, wherein the protrusions of each segment comprise a plurality of radially extending fins defining a plurality of radially open channels between adjacent fins of the plurality of fins, and wherein the single through-hole of each segment is positioned such that each radially open channel is not obstructed by the single through-hole along an entire length of the channel, from the inflow portion to the outflow portion of the channel.

14. A brake assembly comprising:
    a brake disc comprising a plurality of segments arranged to form a front friction ring and a rear friction ring, the friction rings being configured to contact a braking mechanism;
    a hub configured to be connected to an axle, the hub comprising a central rotor and a radially extending flange encircling at least a portion of the central rotor; and
    a pin fixed to and extending through the flange for fixing the brake disc to the flange,
    wherein each segment comprises:
        a front side and a rear side, each side comprising an outer surface configured to be contacted by a brake mechanism and an inner surface connected to a portion of the hub or the axle to impart a braking force thereto;
        a single through-hole extending between the outer surface of the front side and the outer surface of the rear side of the segment for receiving the pin for connecting the segment to the hub or the axle; and
        at least two protrusions extending from the inner surface of the front side to the inner surface of the rear side of the segment, the at least two protrusions forming a radially open channel therebetween, wherein a cross-sectional area of an inflow portion of the channel between the at least two protrusions is smaller than a cross-sectional area of an outflow portion of the channel between the at least two protrusions.

15. The brake assembly of claim 14, wherein the channel extends between a circumferential inner edge and a circumferential outer edge of the inner surface of the sides of the segment, the channel being positioned to direct airflow across the inner surface of the front and rear side of the segment.

16. The brake assembly of claim 14, wherein each of the plurality of segments is fixed to the hub at a single fixation point.

17. The brake assembly of claim 16, wherein, when fixed to the hub, each segment is rotatable about the single fixation point.

18. The brake assembly of claim 14, wherein each of the plurality of segments is fixed to the hub at a single fixation point in order to maximize an air inlet area thereby maximizing an air flux across the inner surface of each segment body.

19. The brake assembly of claim 14, wherein the protrusions comprise a radially extending fin, and further comprising one or more transverse ribs extending between adjacent radially extending fins, the transverse ribs being positioned to define a curving airflow path.

20. The brake assembly of claim 14, wherein the at least two protrusions are positioned such that a radius of the segment passes through each of the at least two protrusions.

21. A brake disc configured to be fixed to a hub and/or axle at a plurality of fixation points, the brake disc comprising a plurality of segments arranged to form a front friction ring and a rear friction ring, wherein each of the plurality of segments comprises:
   a front side and a rear side, each side comprising an outer surface configured to be contacted by a brake mechanism and an inner surface configured to contact a portion of the hub or the axle to impart a braking force thereto;
   a single through-hole extending between the outer surface of the front side and the outer surface of the rear side of the segment for receiving a pin for connecting the segment to the hub or the axle; and
   at least two protrusions extending from the inner surface of the front side to the inner surface of the rear side of the segment, the at least two protrusions forming a radially open channel therebetween,
   wherein a cross-sectional area of an inflow portion of the channel between the at least two protrusions is smaller than a cross-sectional area of an outflow portion of the channel between the at least two protrusions.

22. The brake disc of claim 21, wherein the channel extends between a circumferential inner edge and a circumferential outer edge of the segment and is positioned to direct airflow across the inner surface of the front side and the inner surface of the rear side of the segment.

23. The brake disc of claim 21, wherein each segment is fixed to the hub and/or axle at a single fixation point.

24. The brake disc of claim 23, wherein, when fixed to the hub and/or axle, each segment is permitted to rotate about the single fixation point.

25. The brake disc of claim 21, wherein each of the plurality of segments is fixed to the hub at a single fixation point in order to maximize an air inlet area thereby maximizing an air flux across the inner surface of each segment body.

* * * * *

UNITED STATES PATENT AND TRADEMARK OFFICE
CERTIFICATE OF CORRECTION

PATENT NO. : 10,619,689 B2
APPLICATION NO. : 15/375317
DATED : April 14, 2020
INVENTOR(S) : Roberto Boffelli It is certified that error appears in the above-identified patent and that said Letters Patent is hereby corrected as shown below:

In the Claims

In Claim 9 at Column 14, Lines 18-19, the portion reading "the at least one through-hole" should read --the single through-hole--.

Signed and Sealed this
Twenty-sixth Day of July, 2022

Katherine Kelly Vidal
*Director of the United States Patent and Trademark Office*